(12) United States Patent
Backmann et al.

(10) Patent No.: US 12,572,120 B2
(45) Date of Patent: Mar. 10, 2026

(54) CONTROL METHOD FOR CONTROLLING AT LEAST A PART OF A PRODUCTION PROCESS OF A FILM EXTRUSION LINE

(71) Applicant: Windmöller & Hölscher KG, Lengerich (DE)

(72) Inventors: Martin Backmann, Lengerich (DE); Markus Bussmann, Lengerich (DE); Melanie Schuh, Lengerich (DE); Lennart Ederleh, Lengerich (DE)

(73) Assignee: Windmöller & Hölscher KG, Lengerich (DE)

( * ) Notice: Subject to any disclaimer, the term of this patent is extended or adjusted under 35 U.S.C. 154(b) by 465 days.

(21) Appl. No.: 17/768,894

(22) PCT Filed: Oct. 8, 2020

(86) PCT No.: PCT/EP2020/078235
§ 371 (c)(1),
(2) Date: Apr. 14, 2022

(87) PCT Pub. No.: WO2021/073997
PCT Pub. Date: Apr. 22, 2021

(65) Prior Publication Data
US 2024/0094691 A1 Mar. 21, 2024

(30) Foreign Application Priority Data

Oct. 14, 2019 (DE) ..................... 10 2019 127 548.2

(51) Int. Cl.
*G05B 19/042* (2006.01)

(52) U.S. Cl.
CPC .. *G05B 19/042* (2013.01); *G05B 2219/24209* (2013.01)

(58) Field of Classification Search
CPC ................ G05B 13/042; G05B 19/042; G05B 19/41885; G05B 2219/24209; Y02P 90/02; F16K 27/02; F16K 31/12; F16K 31/58
(Continued)

(56) References Cited

U.S. PATENT DOCUMENTS 5,333,273 A * 7/1994 Raasch ................. G06F 3/0489
708/139
5,397,514 A * 3/1995 Breil ...................... B29C 48/92
425/141
(Continued)

FOREIGN PATENT DOCUMENTS

DE 102016119110 10/2017
WO WO 2018/072773 4/2018

OTHER PUBLICATIONS

Internationaler Recherchenbericht und Schriftlicher Bescheid [International Search Report and the Written Opinion] Dated Jan. 25, 2021 From the International Searching Authority Re. Application No. PCT/EP2020/078235 and Its Translation of Search Report Into English. (11 Pages).
(Continued)

*Primary Examiner* — Chun Cao

(57) ABSTRACT

A method for automated quality control in film extrusion processes using a production model-based control system. The method involves monitoring quality parameters of produced film and comparing them against target values to determine deviations. Using a production model, the system establishes relationships between these quality deviations and physical operating parameters of the extrusion line. Based on these relationships, the system automatically generates and implements control value adjustments to the relevant physical operating parameters. The adjusted parameters are then used to continue film production, creating a
(Continued)

closed-loop control system that maintains product quality. This automated approach enables real-time quality optimization and reduces the need for manual intervention in the film extrusion process.

18 Claims, 5 Drawing Sheets

(58) Field of Classification Search
USPC .......................................................... 700/28
See application file for complete search history.

(56) References Cited

U.S. PATENT DOCUMENTS

| | | | | |
|---|---|---|---|---|
| 2009/0243133 | A1* | 10/2009 | Wong | B29C 48/914 |
| | | | | 264/40.6 |
| 2013/0334730 | A1* | 12/2013 | Maeder | B29C 48/2528 |
| | | | | 264/176.1 |
| 2019/0240888 | A1* | 8/2019 | Lössl | B29C 48/10 |
| 2020/0014581 | A1* | 1/2020 | Aaron | H04L 41/40 |
| 2021/0323213 | A1* | 10/2021 | Schmitz | B29C 48/31 |
| 2024/0094717 | A1* | 3/2024 | Backmann | G05B 13/042 |
| 2024/0103461 | A1* | 3/2024 | Backmann | G05B 13/042 |

OTHER PUBLICATIONS

Internationaler Vorläufiger Bericht Über die Patentierbarkeit [International Preliminary Report on Patentability] Dated Apr. 28, 2022 From the International Bureau of WIPO Re. Application No. PCT/EP2020/078235 and Its Translation Into English. (14 Pages).
Kleiner "Automatisierungssystemc: Regelung", DHBW Mannheim, XP055760763, Retrieved From the Internet, p. 1-12, Aug. 1, 2009.
Mitteilung Gemäß Artikel 94(3) EPÜ [Communication Pursuant to Article 94(3) EPC] Dated Dec. 17, 2024 From the European Patent Office Re. Application No. 20789568.1 and Its Translation Into English. (10 Pages).

* cited by examiner

CONTROL METHOD FOR CONTROLLING AT LEAST A PART OF A PRODUCTION PROCESS OF A FILM EXTRUSION LINE

RELATED APPLICATIONS

This application is a National Phase of PCT Patent Application No. PCT/EP2020/078235 having International filing date of Oct. 8, 2020, which claims the benefit of priority of German Patent Application No. 10 2019 127 548.2 filed on Oct. 14, 2019. The contents of the above applications are all incorporated by reference as if fully set forth herein in their entirety.

FIELD AND BACKGROUND OF THE INVENTION

The present invention relates to a control method for a control of at least a part of a production process of a film extrusion line, and to a corresponding computer program product.

It is known that film extrusion line can be evaluated on the basis of input parameters and output parameters with regard to a production situation and/or with regard to a film product situation. This applies in particular to the setting, i.e. the control and/or the regulation of the film extrusion line. For example, a large number of input parameters are required to set the film extrusion line to produce a defined film product situation. Such input parameters can be, for example, parameters of the raw materials, parameters of the recipe, but also parameters of the film extrusion line itself. The evaluation of the quality of the film product also depends on a large number of parameters. For example, the initial parameter here can be the output parameter, i.e. the actual fulfillment of a function of the film, but also measurable film parameters such as tear strength or stretchability.

Known solutions are based to a large extent on the experience and knowledge of the operating personnel for the control and/or regulation of the film extrusion line. Thus, based on the experience of the operating mode of the film extrusion lines, the operating personnel know which settings have to be made in order to achieve a defined film product or to change, in particular improve, individual result parameters in the film product situation. However, this leads to the fact that with different operating personnel also different and above all not reworkable processes lead to the fact that different film product situations arise. Although this is usually still sufficient in principle to ensure a sufficient level of quality for the film product, a high reject rate is achieved in the event of an error. Especially when switching between different film products, but also when changing operators, there is therefore a high risk that the film product will change in terms of production quality.

It is therefore the object of the present invention to at least partially eliminate the disadvantages described above. In particular, it is the task of the present invention to find ways of influencing the control of a film extrusion line in a cost-effective and simple manner.

The foregoing problem is solved by a control method having the features of claim 1 and a computer program product having the features of claim 10. Further characteristics and details of the invention result from the dependent claims, the description and the drawings. Features and details described in connection with the control method according to the invention naturally also apply in connection with the computer program product according to the invention and vice versa in each case, so that reference is or can always be made mutually with regard to the disclosure concerning the individual aspects of the invention.

SUMMARY OF THE INVENTION

A control method according to the invention is used to control at least part of a production process of a film extrusion line by means of a production model. Such a control procedure has the following steps:

Acquisition of at least one model parameter in the form of an output parameter of the production model for the acquisition of a film product situation, Determining a difference value between the at least one sensed output parameter and a correlating set point, Forming a parameter relationship between the determined difference value and at least one model parameter in the form of an input parameter of the production model, Generating at least one control value as a default for the at least one input parameter of the formed parameter relationship.

A control method according to the invention thus serves to influence a film extrusion line and the production process taking place thereon, in particular in a controlling or regulating manner. The control is based on a generally known logic of a target/actual comparison. For this purpose, a model parameter is recorded in the form of an output parameter of the production model. This allows the film product situation to be recorded. These can be, for example, film parameters, but also stability parameters of the film sheet, which is produced by the film extrusion line. The recording can be done directly or indirectly as well as inline but also offline. In particular, the step of sensing is integrated into a control process so that a closed control loop can be formed.

In a second step, a difference value is determined, i.e. a deviation, between the recorded output parameter and a set point correlating with this output parameter. This set point can be a static set point, but also a regularly varying set point. In particular, the set point can also have additional dependencies, for example on the recipe currently being produced on the film extrusion line.

One of the core ideas of the present invention now lies in the next step, in which a parameter relationship is formed, namely between the determined difference value and at least one model parameter in the form of an input parameter of the production model. Such a production model can be, for example, an algorithmic model, an empirical model, and/or a model based on so-called artificial intelligence. So-called neural networks can be used here, for example, which use corresponding training data to map the individual model parameters that are present in real terms on the film extrusion line and relate them to each other. According to the invention, such a parameter relationship is now established by the production model between the difference value and at least one input parameter. Thus, it is determined in what way and with what parameter relationship the detected and determined difference interacts with one or more input parameters of the production model. In the final step, at least one control value is now generated as a default for the at least one input parameter of the formed parameter relationship. This control value is based on the parameter relationship and now allows the difference to be compensated. The aim of a control process according to the invention is therefore to compensate for and reduce undesirable deviations from set points by means of control intervention or actuator intervention. For this purpose, a combination of determinations on the film extrusion line on the one hand and the use of a digital production model on the other hand takes place. The key idea according to the invention is that such control does not have to take place solely on the basis of an operator's experience or actual knowledge of the particular film extrusion line. Rather, predictable and reworkable automated or semi-automated control of the film extrusion line and the production process can take place. According to the invention, this is made possible by the fact that a production model now provides the parameter relationship between the difference value and at least one input parameter. It should be noted that the film extrusion line can be any form of film extrusion line. In particular, this includes blown film machines as well as flat film machines. The more complex the parameter relationships between the individual model parameters in the production model are, the more advantageous it is if the production model has at least artificial intelligence. However, combinations between classical algorithmic models, empirical models and neural networks in the form of artificial intelligence are of course also conceivable within the scope of the present invention.

In a process according to the invention, it is basically irrelevant what happens to the generated control value. For example, the control value can be stored in a very simple way, so that a sustainable monitoring of the production process can take place. In addition, an output of the generated control value is also conceivable, in principle as an indication for the operating personnel, with which parameter relationship a control value for a control of a machine or a manual intervention at the machine would be useful. Last but not least, an active control intervention in the form of an automated control with the generated at least one control value is also conceivable in the sense of the present invention.

For the purposes of the present invention, a model parameter means any parameter that can be used in the production model. In particular, such model parameters can be divided into input parameters and output parameters of the film extrusion line.

In addition to the improved control process and the improved control of a film extrusion line, additional advantages can be achieved here with the film product. In particular, a prediction of film properties can be made, since a defined correlation between the production result and the production process of the film extrusion line can be established by the parameter relationship of the production model. In other words, it is possible to make a quality promise, so to speak, which brings great advantages, especially for liability reasons, but also for quality reasons in the customer relationship.

There may be advantages if, in a control process according to the invention, the generated control value is output as an indication to the operating personnel. The generated control value in the form of an indication can, for example, take the form of a visual display. The output is also conceivable both as a single generated control value, but also as a control value corridor. Also the basic output, in which direction and at which input parameter an adjustment or a manual intervention would make sense, can be provided as output of the control value. For example, the output would be an incorrect positioning of the frost line in a flat film production. As an indication, the generated control value would output to the operator that a greater cooling capacity is to be generated. Thus, an improvement of the production process is already possible by the mere generation of the control value and the corresponding output as indication to the operating personnel.

It is also advantageous if, in a control process according to the invention, the generated control value directly or indirectly alters an input parameter, in particular in the form of a machine parameter, of the film extrusion line in a targeted manner. Such intervention can also be understood as automatic control or automatic regulation. The targeted intervention or direct adjustment of the machine parameter can be, for example, an intervention in the melt temperature in the case of a direct input parameter. Indirect adaptation, for example when a cooling capacity is adapted in the event of an incorrect melt temperature, is also conceivable here. Here, as it were, improved or optimized control is possible with the aid of the control method for the film extrusion line according to the invention.

Further advantages can be brought about if, in a control method according to the invention, the steps of detecting, determining, forming and generating are carried out at least partially, in particular completely or substantially completely, before the start of a production process of the film extrusion line for forming a start configuration of the at least one input parameter. In this way, it is thus possible to adopt a presetting, so to speak, for the film extrusion line with a control method according to the invention in order to start the production process. In particular, start-up conditions, for example a cold film extrusion line, flow channels for extrusion material that are not yet occupied or similar, can be taken into account. In this way, a control method according to the invention is used for an improved and a stabilized start-up of the film extrusion line.

Further advantages can be achieved if, in a control method according to the invention, the steps of detecting, determining, forming and producing are carried out at least partially, in particular completely or substantially completely, after the start of a production process of the film extrusion line. In particular, it is an implementation of the control procedure during the operation of the production process of the film extrusion line. In other words, continuous closed-loop and/or open-loop control may be possible here during operation of the film extrusion line. Of course, such an operational control procedure can be combined with a start-up control procedure according to the preceding paragraph.

There are further advantages if, in a control method according to the invention, a result of a control intervention is recorded and, in particular, stored in the form of a changed, recorded output parameter on the basis of the generated control value. Such a result thus gives the feedback how successful the generated control value has actually had an effect. Such a feedback and storage of the feedback allows to perform an appropriately adapted control in the future. If, for example, the generated control value based on the control method according to the invention does not lead to the desired qualitative or quantitative control intervention, either the parameter relationship can be changed specifically or even the complete production model can be changed by this feedback. This is of course also possible with two or more model parameters. In other words, in this way it becomes possible to ensure a self-learning production model or control process.

Further advantages can be gained if, in a control process according to the invention, a difference value is again determined for the changed, recorded output parameter, in particular with the same set point, so that a control success is defined and, in particular, integrated into the production model. Such a memory of the control success or an output of the control success carries forward the advantages according to the preceding paragraph. A self-learning system will now go beyond the individual parameter relationships to further educate the production model and, in particular, modify it. Starting from a basic production model, the production model is specifically taught to the respective film extrusion line by these feedbacks. Of course, it is also possible to make such learning successes available to other film extrusion lines in a machine park via the individual film extrusion line, for example with the aid of a cloud system.

It is further advantageous if, in a control method according to the invention, a specific film extrusion line is selected from a set of existing film extrusion lines for production on the basis of the at least one input parameter generated. Again, the control procedure is upstream of the production process. For example, it is conceivable that different production models, and also different film extrusion lines, may be better or worse suited to a particular production job in different ways. A control process now makes it possible to select, in an automated and/or assisted manner, the most suitable part of the machinery for the particular production job, i.e. an exact, specific, best-fit film extrusion line. A wide variety of priorities can be selected. For example, the capacity utilization of a film extrusion line, the throughput or even quality requirements of the film product can be given the appropriate priority. This selection can be either automated or used as an indication for a manual selection of the corresponding specific film extrusion line.

It is further advantageous if, in a control method according to the invention, the generation of the control value involves a safeguarding of a minimum quality, in particular in the form of an upper limit for the determined difference value. In this way, a quality promise can be made, so to speak, that the maximum deviation from the required production quality can be specified. This can also be further optimized by monitoring, especially over the course of the control and the setting of the inertia or the permitted control deflections.

Also an object of the present invention is a computer program product comprising instructions which, when the program is executed on a computer, cause the computer to perform the steps of a method according to the invention. Thus, a computer program product according to the invention brings the same advantages as have been explained in detail with reference to a method according to the invention.

Further advantages, features and details of the invention are given in the following description, in which, with reference to the drawings, embodiments of the invention are described in detail. The features mentioned in the claims and in the description may be individually or in any combination substantially inventive.

BRIEF DESCRIPTION OF THE SEVERAL VIEWS OF THE DRAWINGS

The accompanying drawings are schematic representations, in which.

DESCRIPTION OF SPECIFIC EMBODIMENTS OF THE INVENTION

Figure 1:
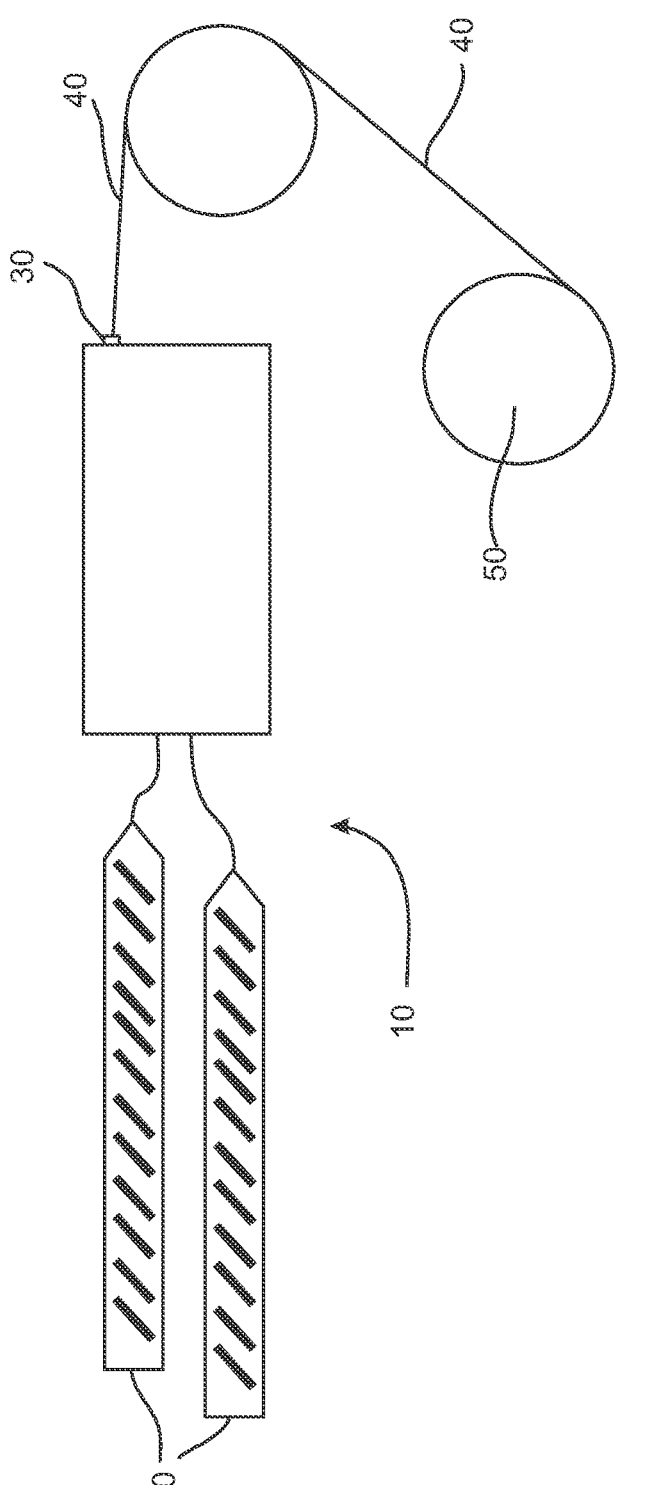
FIG. 1 shows an embodiment of a film extrusion line.
Figure 2:
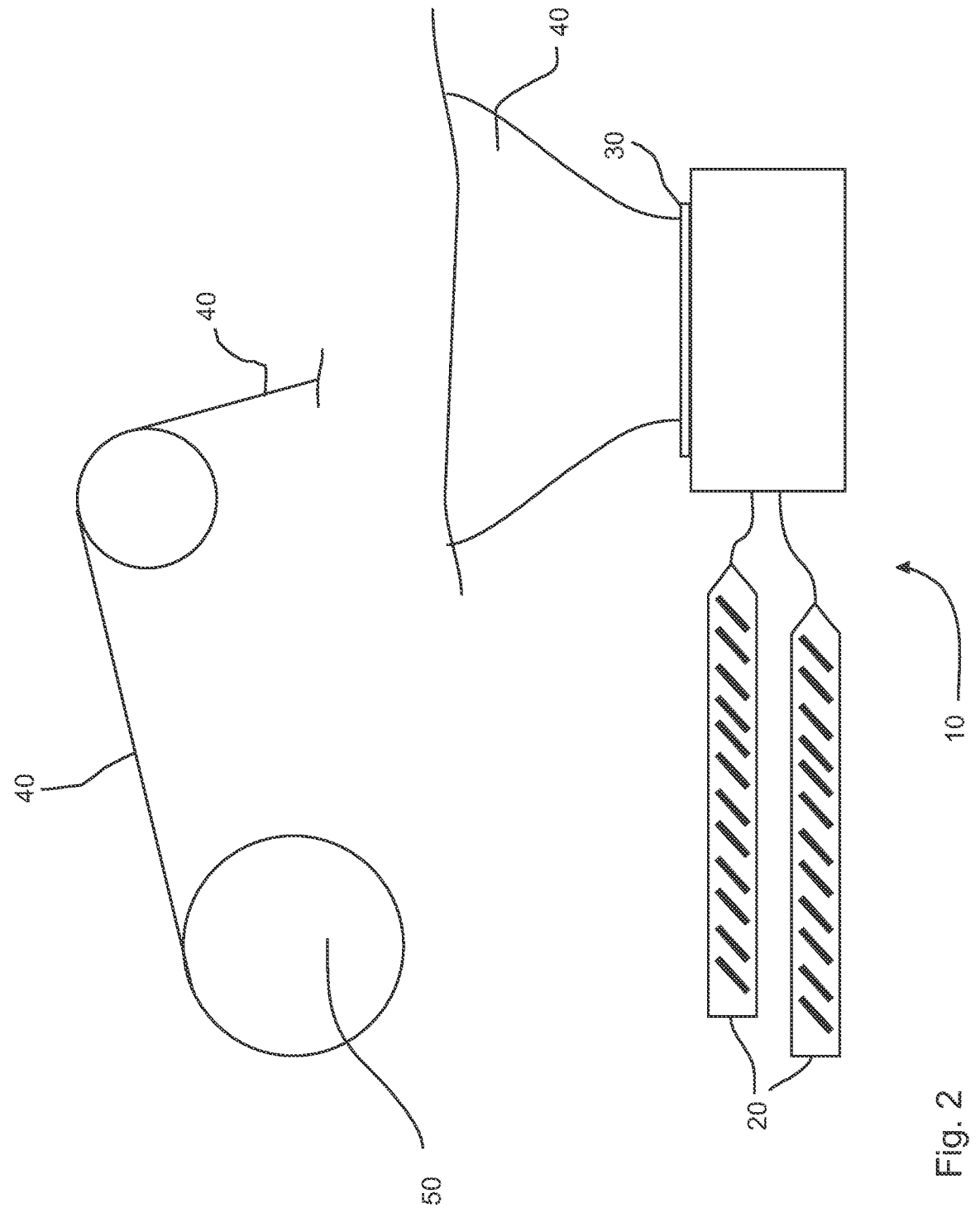
FIG. 2 shows another embodiment of a film extrusion line.

FIGS. 1 and 2 show exemplary film extrusion lines 10. FIG. 1 shows a flat film extrusion line, which is schematically equipped with two extruders 20 for different formulations. A film sheet 40 is discharged from the nozzle 30, which cools on a chill roll and is then wound on a winding roll 50. In the same way, however, a control method according to the invention can also be used in a flat film extrusion line or in a blown film extrusion line according to FIG. 2. Here, too, two extruders 20 are provided schematically, with the nozzle 30 designed as an annular blowing nozzle. The film sheet 40 is laid flat and also unwound or wound up at the top over a winding roller to the left.

Figures 3, 4:
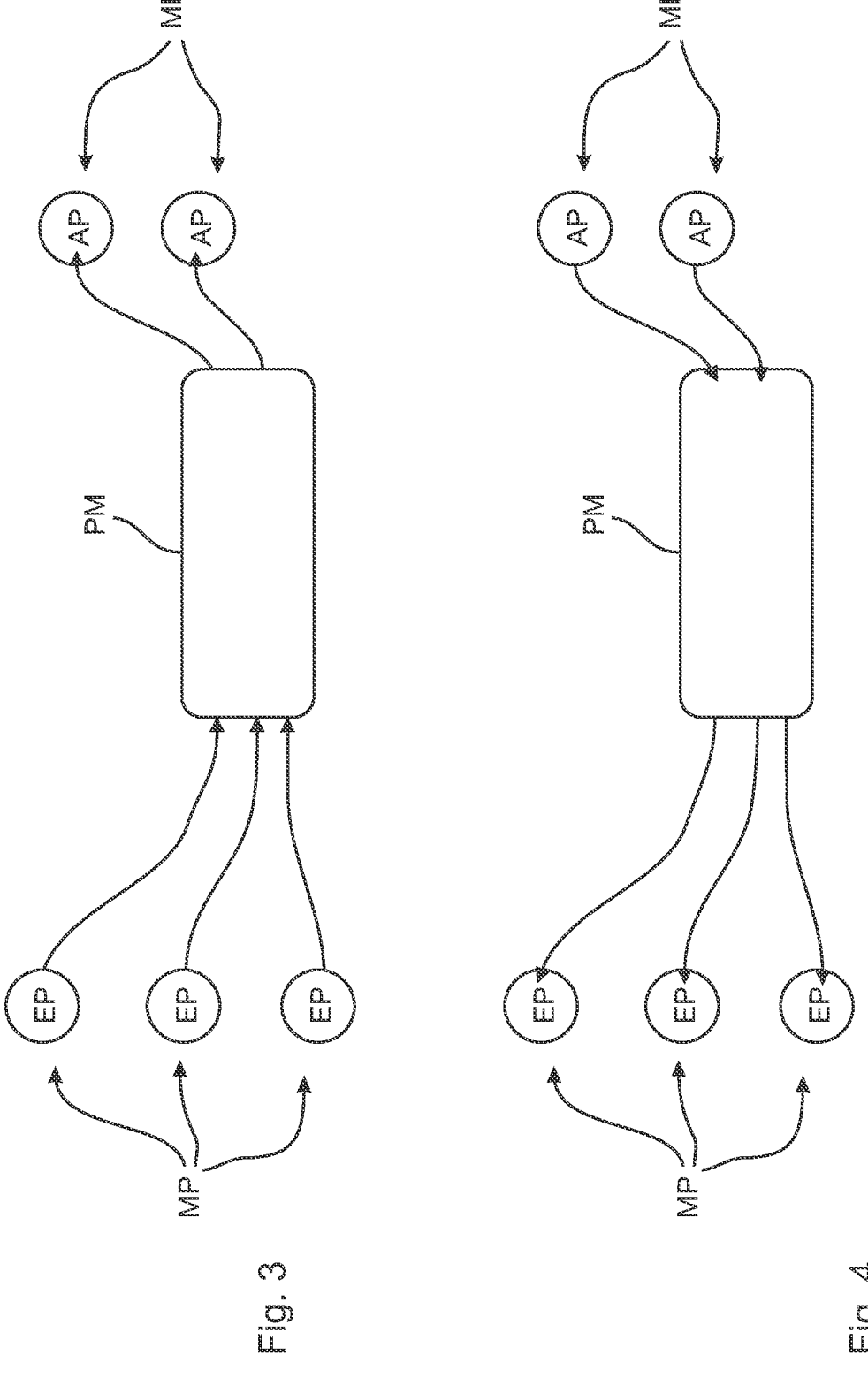
FIG. 3 shows an embodiment of a parameter relationship according to the invention.
FIG. 4 shows a further embodiment of a parameter relationship according to the invention.

FIGS. 3 and 4 show schematically how a production model, for example in the form of artificial intelligence, links input parameters EP and output parameters AP. In FIG. 3, three input parameters EP are linked as model parameters MP with two output parameters AP. The input parameters EP are entered into the production model and the output is two output parameters AP. The embodiment of FIG. 4 works in reverse order. It is irrelevant whether the production model PM is a purely empirical or algorithmic model or an artificial intelligence.

Figure 5:
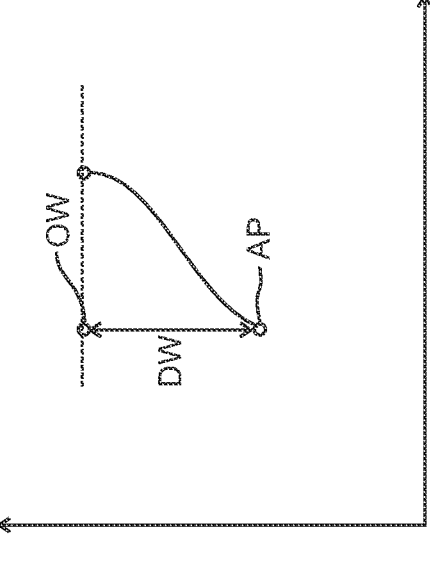
FIG. 5 shows a possibility of using a control method.

With reference to FIGS. 5 to 8, it is explained in more detail how the setting functionality takes place. Thus, FIG. 5 shows a situation where an output parameter AP is measured. Here it can be seen clearly that there is a difference to the set point OW, whereby a difference value DW can be determined via the production model PM. Over the time in FIG. 5 to the right, the output parameter AP can now move in the direction of the set point OW via a corresponding control intervention.

Figure 6:
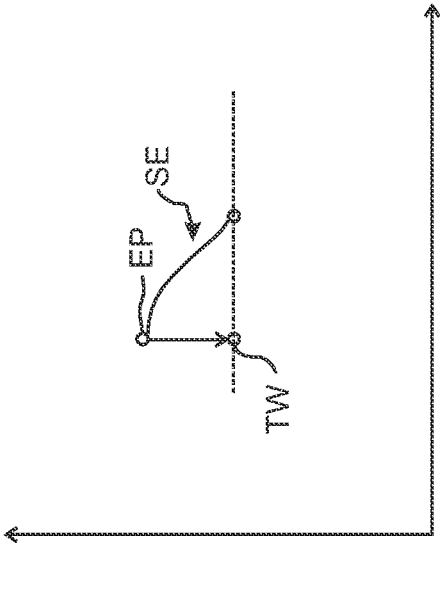
FIG. 6 shows a further possibility of carrying out a control method according to the invention.
Figure 6:

FIG. 6 shows how the control value TW can have an effect. Thus, a different situation is shown here, namely an input parameter EP that is to overcome a control value by a control intervention SE. From the measured or recorded input parameter EP, this is to be moved downwards to the right over time, i.e. with a negative control value TW. It is explained in more detail in the following figures in how far this control intervention is successful.

Figure 7:
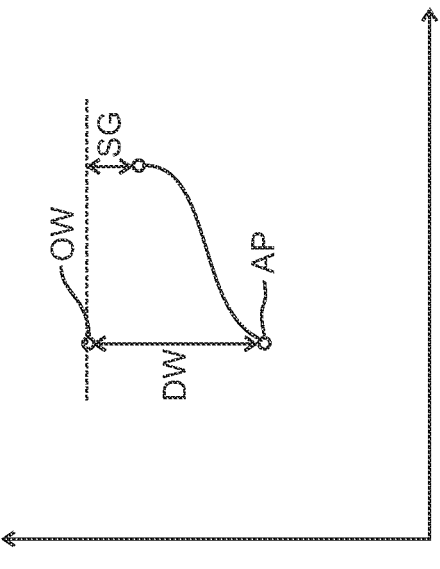
FIG. 7 shows a further possible implementation of a control method according to the invention.

FIG. 7 now shows how a corresponding control value causes the output parameter AP to move in the direction of the set point OW. However, at least in the first control iteration, this does not completely reach the set point OW, but only approaches it. The difference here can be described as a control success SG, which was only partially successful here. Thus, a residual difference value remains, which is used for a subsequent iteration as a new and thus reduced difference value for the following iteration loop of the control.

The preceding explanation of the forms of embodiments describes the present invention exclusively in the context of embodiments. Of course, individual features of the embodiments can be freely combined with each other, if technically reasonable, without leaving the scope of the present invention.

REFERENCE SIGN LIST

10 Film extrusion line
20 Extruder
30 Nozzle

40 Film sheet
50 Winding roll
PM Production model
MP Model parameter
EP Input parameter
AP Output parameters
DW Difference value
OW Set point
TW Control value
SE Control intervention
SG Control success
What is claimed is:

1. A control method for controlling at least part of a production process of a film extrusion line by means of a production model, comprising:

Acquiring a first film parameter or stability parameter of a film produced by the film extrusion line;

determining a difference value between the acquired first film parameter or stability parameter and a correlating set point;

forming a parameter relationship between the determined difference value and at least one input or output parameter of the film extrusion line using the production model;

automatically generating a control value for adjusting the input or output parameter based on the formed parameter relationship;

automatically adjusting the input or output parameter of the film extrusion line according to the generated control value;

instructing a production of a film using the film extrusion line with the adjusted input or output parameter.

2. The control method according to claim 1, wherein the control value is output as an indication to an operating personnel.

3. The control method according to claim 1, wherein the control value alters the input or output parameter.

4. The control method according to claim 3, wherein the control value alters a machine parameter of the film extrusion line.

5. The control method according to claim 1, wherein the steps are carried out before a start of a production process of the film extrusion line for forming a start configuration of the input or output parameter.

6. The control method according to claim 5, wherein the steps are carried out completely before the start of the production process of the film extrusion line for forming the start configuration of the input or output parameter.

7. The control method according to claim 1, wherein the steps are carried out after the start of the production process of the film extrusion line.

8. The control method according to claim 7, wherein the steps are carried out completely after the start of the production process of the film extrusion line.

9. The control method according to claim 1, wherein based on the control value, a result of a control intervention is detected.

10. The control method according to claim 9, wherein based on the control value, a result of a control intervention is detected and stored.

11. The control method according to claim 9, wherein a new film parameter or stability parameter is determined after the control intervention so that a control success is defined.

12. The control method according to claim 11, wherein the new film parameter or stability parameter is determined using the correlating set point so that the control success is defined.

13. The control method according to claim 1, wherein based on input or output parameter, a specific film extrusion line is selected from a set of existing film extrusion lines for production.

14. The control method according to claim 1, wherein a safeguarding of a minimum quality is effected by the generation of the control value.

15. The control method according to claim 14, wherein the safeguarding of the minimum quality comprises an upper limit for the determined difference value when generating the control value.

16. A computer program product comprising instructions stored on a non-transitory computer-readable medium which, when executed by a processor, cause the processor to:

acquire a first film parameter or stability parameter of a film produced by a film extrusion line;

determine a difference value between the acquired first film parameter or stability parameter and a correlating set point;

form a parameter relationship between the determined difference value and at least one input or output parameter of the film extrusion line using a production model;

automatically generate a control value for adjusting the input or output parameter based on the formed parameter relationship;

automatically adjust the input or output parameter of the film extrusion line according to the generated control value;

instruct a production of a film using the film extrusion line with the adjusted input or output parameter.

17. A control method for controlling at least part of a production process of a film extrusion line by means of a production model, comprising:

acquiring a first film parameter or stability parameter of a film produced by the film extrusion line before a start of a production process;

determining a difference value between the acquired first film parameter or stability parameter and a correlating set point before a start of the production process;

forming a parameter relationship between the determined difference value and at least one input or output parameter of the film extrusion line using the production model before the start of the production process;

automatically generating a control value for adjusting the input or output parameter based on the formed parameter relationship before the start of the production process;

automatically adjusting the input or output parameter of the film extrusion line according to the generated control value to form a start configuration; and instructing a production of a film using the film extrusion line with the adjusted input or output parameter.

18. A control method for controlling at least part of a production process of a film extrusion line by means of a production model, comprising the following steps:

acquiring for acquisition of a film product situation at least one model parameter in form of an output parameter of the production model, determining a difference value between the at least one acquired output parameter of the production model and a correlating set point, forming a parameter relationship between the determined difference value and at least one model parameter in form of an input parameter of the production model, generating at least one control value as a default for the at least one input parameter of the production model of the formed parameter relationship, wherein the steps of acquiring, determining, forming and generating are carried out at least partially, before start of a production process of the film extrusion line for forming a start configuration of the at least one input parameter.

\* \* \* \* \*